US006526911B2

(12) United States Patent
Louden

(10) Patent No.: US 6,526,911 B2
(45) Date of Patent: *Mar. 4, 2003

(54) FEED OR WATER DISH ASSEMBLY FOR ANIMAL CAGES

(75) Inventor: Richard E. Louden, North Lewisburg, OH (US)

(73) Assignee: Louden Bros. Tool Co., Inc., North Lewisburg, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/801,319

(22) Filed: Mar. 7, 2001

(65) Prior Publication Data

US 2001/0020449 A1 Sep. 13, 2001

Related U.S. Application Data

(63) Continuation-in-part of application No. 09/522,124, filed on Mar. 9, 2000, now Pat. No. 6,199,510.

(51) Int. Cl.7 .............................................. A01K 39/01
(52) U.S. Cl. ..................................................... 119/51.01
(58) Field of Search ................... 119/51.01, 52.1–52.4, 119/53.5, 54, 57.8, 57.9, 61, 456, 454, 467–469, 475, 477; 220/475, 476, 478, 480–482, 212, 631, 576, 615–617, 684, 737, 214, 215, 180, 220.21, 304, 225.11; D30/121–133; 215/390, 395

(56) References Cited

U.S. PATENT DOCUMENTS

| 2,773,473 A | * | 12/1956 | Martin ........................ 119/464 |
| 2,979,301 A | * | 4/1961 | Reveal ........................ 220/737 |
| 3,025,122 A | * | 3/1962 | Millman ..................... 220/476 |
| 3,185,133 A |   | 5/1965 | Bird |
| 3,299,839 A |   | 1/1967 | Nordbak |
| 3,477,677 A |   | 11/1969 | Hindley |
| 4,995,337 A |   | 2/1991 | Abrams et al. |
| 5,018,480 A |   | 5/1991 | Goldman et al. |
| 5,323,733 A |   | 6/1994 | Youngs-McVicker |
| 5,351,645 A |   | 10/1994 | Brennon |
| 5,467,733 A | * | 11/1995 | Messina ..................... 119/464 |
| 5,549,074 A |   | 8/1996 | Hui |
| 5,832,872 A |   | 11/1998 | Pearce |
| 5,870,969 A |   | 2/1999 | Boyce |
| 6,082,573 A | * | 7/2000 | Hofman et al. ............. 220/480 |
| 6,199,510 B1 | * | 3/2001 | Louden .................... 119/51.01 |
| 6,227,400 B1 | * | 5/2001 | Paladino .................... 220/478 |

FOREIGN PATENT DOCUMENTS

JP 654720 1/1994

* cited by examiner

Primary Examiner—Thomas Price
(74) Attorney, Agent, or Firm—Biebel & French

(57) ABSTRACT

A feed dish assembly for use in combination with a cage having a cage side formed as a lattice of horizontal and vertical members. The feed dish assembly includes a dispenser and mounting structure wherein the mounting structure includes a pair of elongated leg members having enlarged end portions. The mounting structure further includes a slide member having a pair of slots for engaging over the leg members wherein the slide member is retained on the leg members between the dispenser and the enlarged portions to retain the dispenser in engagement with the side of a cage with the leg members extending through the lattice structure.

12 Claims, 8 Drawing Sheets

FEED OR WATER DISH ASSEMBLY FOR ANIMAL CAGES

RELATED APPLICATION

The present application is a continuation-in-part of application Ser. No. 09/522,124, filed Mar. 9, 2000, now U.S. Pat. No. 6,199,510.

BACKGROUND OF THE INVENTION

The present invention relates generally to an animal feed or water dish and, more particularly, to a dish assembly including mounting means for facilitating mounting the dish assembly to the side of a cage defined by a lattice structure.

It is well known to provide feed dishes for cages containing small birds or animals wherein the dish is adapted to be mounted to the side of the cage. Known feed dishes utilize a number of different designs and mechanisms for attaching the dishes to the side of a cage. For example, a known mounting structure is provided for engaging between two adjacent vertical elements of a cage lattice structure, and another known mounting structure includes members for hanging the dish from a horizontally extending element of the cage structure. Typically, there is a trade-off between securely mounting the dish or feeder to the side of the cage and providing for ease of removal of the dish, such as may be necessary for refilling or cleaning the dish.

In a recently proposed structure, disclosed in U.S. Pat. No. 5,832,872, a mounting structure integrally formed with the feeding dish is described, including a threaded male member which is adapted to extend through the side of a cage and be engaged by a cooperating threaded female member to thereby retain the dish in position on the cage. The design of such a mounting structure requires facility in rotating threaded members, which in certain circumstances may hinder use of the feeder due to the particular location of the cage and/or abilities of the person attending to the feeder.

Accordingly, there remains a need for a dish assembly which may be securely mounted to the lattice structure of an animal cage, and which is further characterized by a mechanism which is easily and quickly manipulated to mount and dismount the dish assembly relative to the cage side.

SUMMARY OF THE INVENTION

The present invention provides a dish assembly for use in combination with a cage having a cage side formed as a lattice of horizontal and vertical members. The dish assembly includes a bowl, or an upper storage compartment and lower tray, and a mounting structure for attaching the dish assembly to a cage side wherein the dish assembly is formed with at least one sidewall and a bottom connected to the sidewall to define an area for retaining food or water. The mounting structure includes an elongated leg structure integrally formed with the side wall and extending from the side wall through the lattice of the cage side. The leg structure includes an enlarged portion located at an end of the leg structure distal from the side wall.

The mounting structure further includes a slide member for engaging the leg structure in linear sliding movement. In use, the dish assembly is positioned with the leg structure extending through the cage side, and the slide member engages over the leg structure in linear sliding movement perpendicular to the leg structure and parallel to the sidewall whereby the slide member is located between the sidewall and the enlarged portion to wedge the cage side between the slide member and the sidewall.

In the preferred embodiments, the leg structure comprises a pair of leg members located in horizontally spaced relation to each other, and the enlarged portion includes a flange member extending horizontally in a perpendicular direction from each of the leg members. The slide member is formed as a planar element including top and bottom edges wherein a pair of slots are formed extending upwardly from the bottom edge toward the top edge for engaging over the leg members.

The design of the present dish assembly provides for ease of placement of the dish assembly in association with the side of a cage, and further provides for ease of secure attachment of the dish assembly by placement of the slide member in association with the leg structure through simple linear movement of the slide member relative to the leg structure.

Therefore, it is an object of the present invention to provide a dish assembly which is easily attached to the side of a cage defined by a lattice structure.

It is a further object of the invention to provide such a dish assembly with a mounting structure which is operated with a minimum of manipulation while providing a secure mounting for the dish assembly.

Other objects and advantages of the invention will be apparent from the following description, the accompanying drawings and the appended claims.

DETAILED DESCRIPTION OF THE PREFERRED EMBODIMENTS

Figure 1:
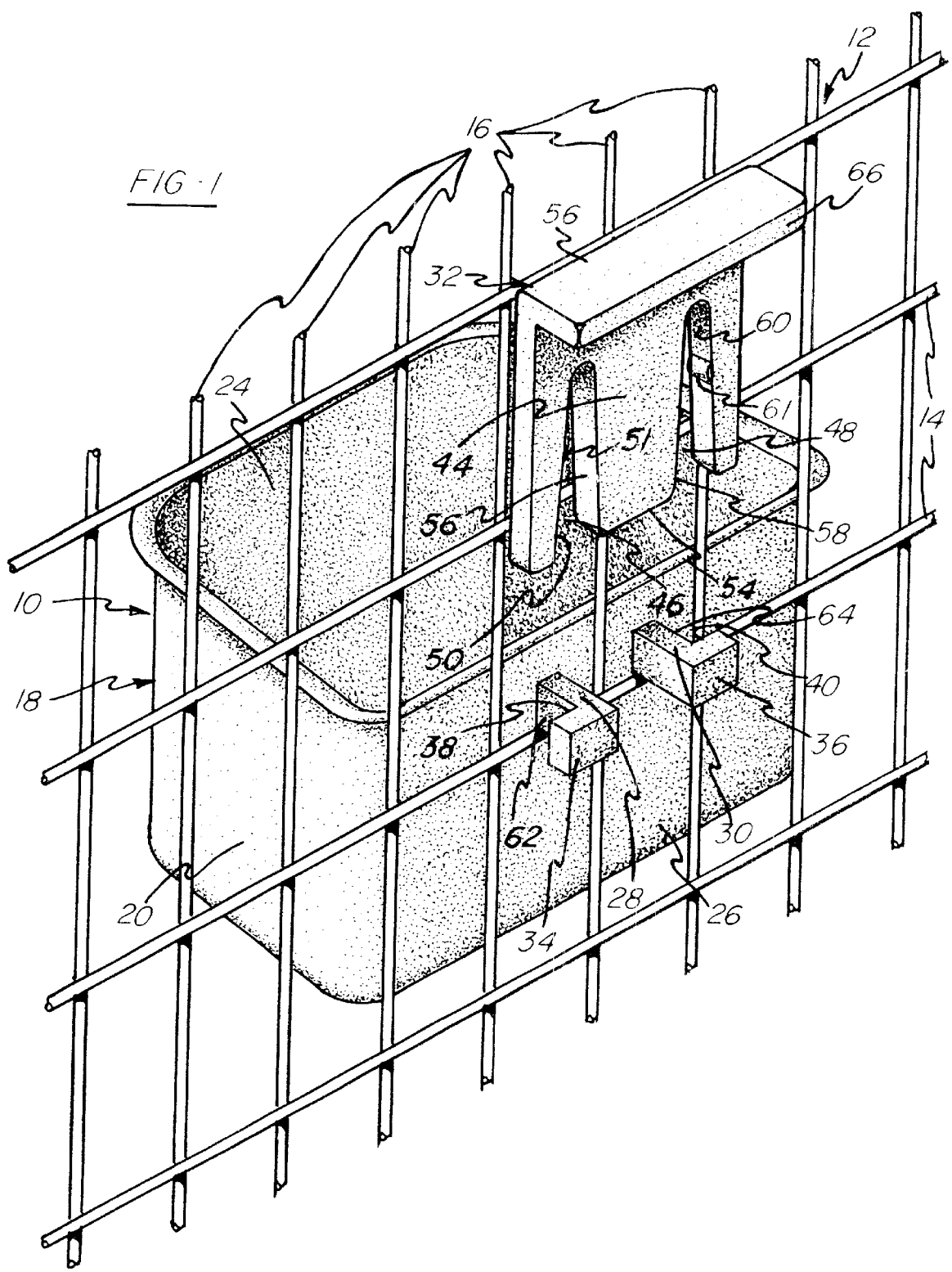
FIG. 1 is a partially exploded rear perspective view of the feed dish showing the mounting structure prior to attachment to the side of a cage.

Referring initially to FIG. 1, an animal feed dish 10 in accordance with the present invention is illustrated in association with an animal cage side 12 formed as a lattice structure of interconnected horizontal elements 14 and vertical elements 16.

Figure 2:
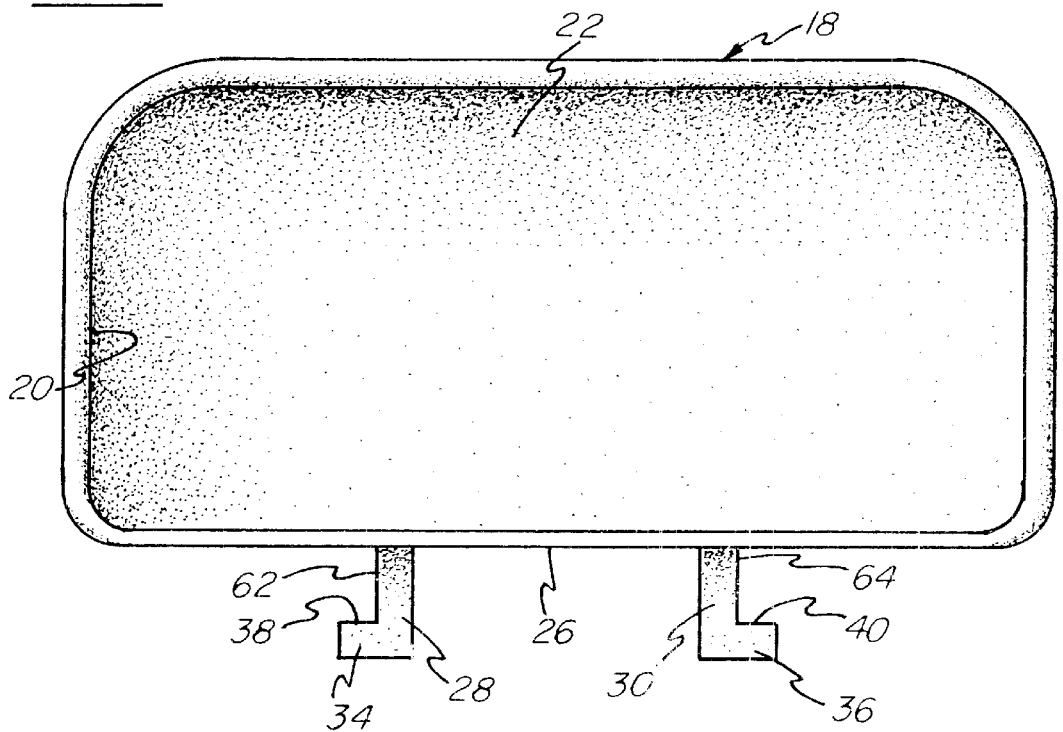
FIG. 2 is a top plan view of the bowl for the present invention.

Referring additionally to FIG. 2, the feed dish 10 comprises a bowl 18 defined by a side wall 20 and a bottom portion 22 connected to the side wall for retaining food or water therein, and further including an open top area 24 for access to the interior of the bowl 18. The side wall 20 of the bowl 18 includes a flat rear portion 26 corresponding to the planar configuration of the cage side 12. It should be understood that within the scope of the present invention, the rear portion 26 may be configured differently to correspond to other cage side shapes, such as by being provided with a curvature to correspond to a curved cage side.

The feed dish 10 is further provided with a mounting structure including an elongated leg structure defined by a pair of horizontally spaced, elongated legs 28, 30, and a slide member 32. The legs 28, 30 are formed integrally with and extend perpendicularly from the rear portion 26 of the bowl 18, and in the preferred embodiment, the bowl 18 and legs 28, 30 are molded of an ABS plastic, as is the slide member 32.

The leg members 28, 30 each terminate in a respective flange member 34, 36 defining an enlarged portion for the leg structure at an end of the leg structure distal from the rear portion 26 of the bowl 18. The flange members 34, 36 each define a respective wall 38, 40 extending horizontally in a perpendicular direction from the leg members 34, 36, respectively.

Figure 3:
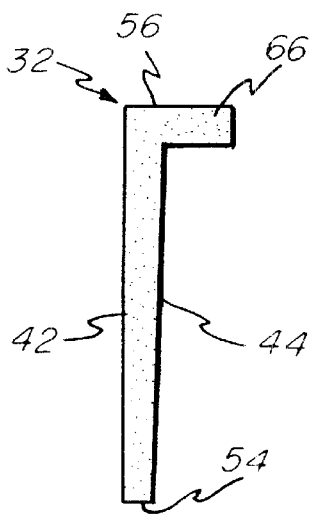
FIG. 3 is a side elevational view of the slide member for the mounting structure.

Referring to FIGS. 1 and 3, the slide member 32 in the illustrated embodiment of the invention comprises a generally planar member defined by a front planar face 42 and a rear planar face 44. The slide member 32 includes a slot structure defined by a pair of horizontally spaced slots 46, 48 wherein the slot 46 is defined by a pair of opposing walls 50, 52 which taper toward each other in a direction from a bottom edge 54 of the slide member 32 toward a top edge 56 thereof. Similarly, the slot 48 is defined by a pair of opposing walls 58, 60 which taper in toward each other in the direction from the bottom edge 54 toward the top edge 56. The slots 46, 48 are sized to receive the legs 28, 30 therein, and the spacing between the wall 50 of the slot 46 and the wall 60 of the slot 48, at the upper ends thereof, generally corresponds to the spacing between the outer surface 62 of the leg 28 and the outer surface 64 of the leg 30. Also, it should be noted that each of the walls 50, 60 are provided with a respective protrusion 51, 61 (FIGS. 1 and 4) for providing a snap fit connection to retain the slide member 32 on the legs 28, 30.

The slide member 32 is further provided with a ledge portion 66 extending laterally along and rearwardly from the upper edge 56. The ledge portion 66 provides an engagement surface for facilitating tactile manipulation of the slide member 32.

Figure 4:
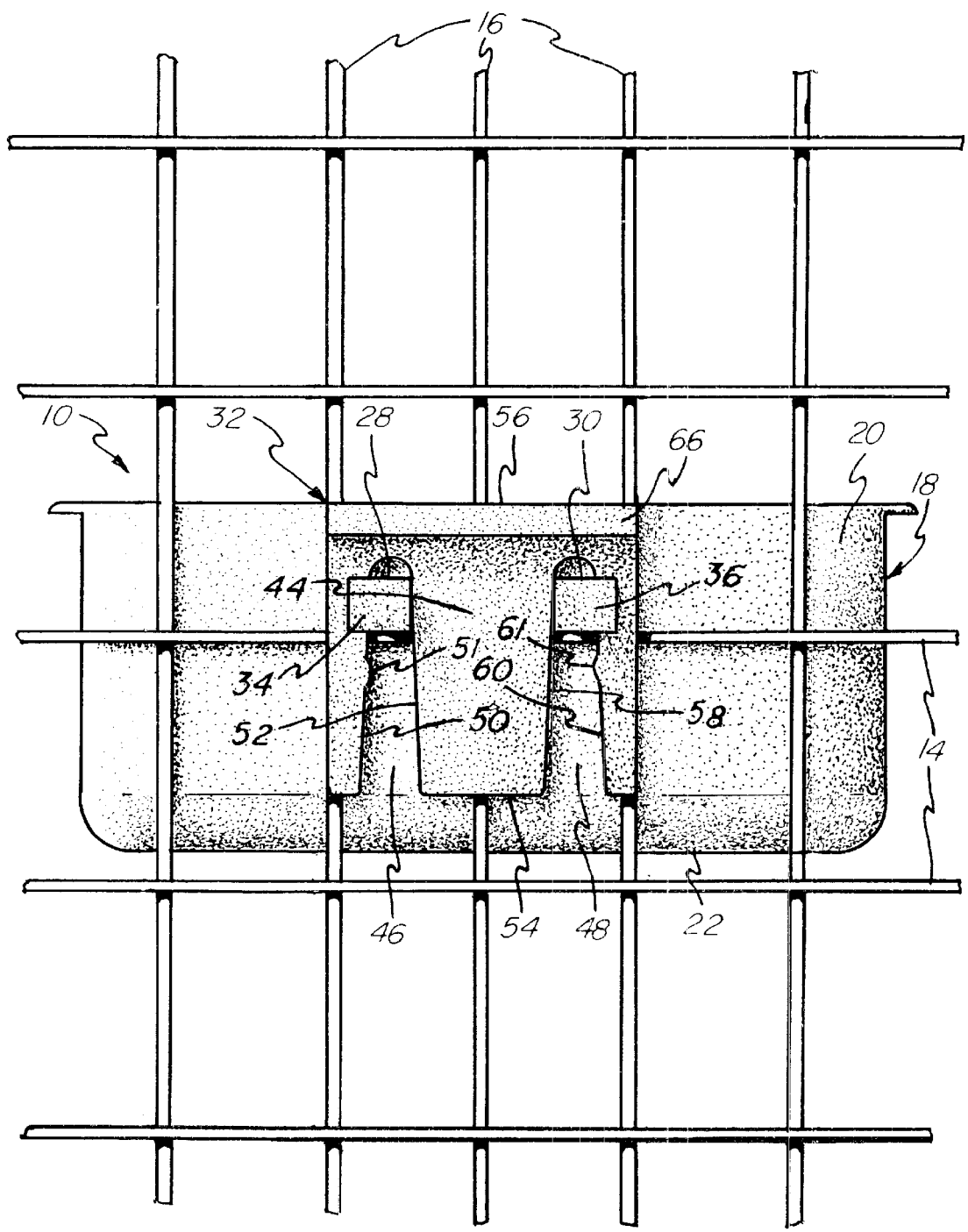
FIG. 4 is a rear elevational view of the feed dish with the mounting structure supporting the dish on a cage side.
Figure 5:
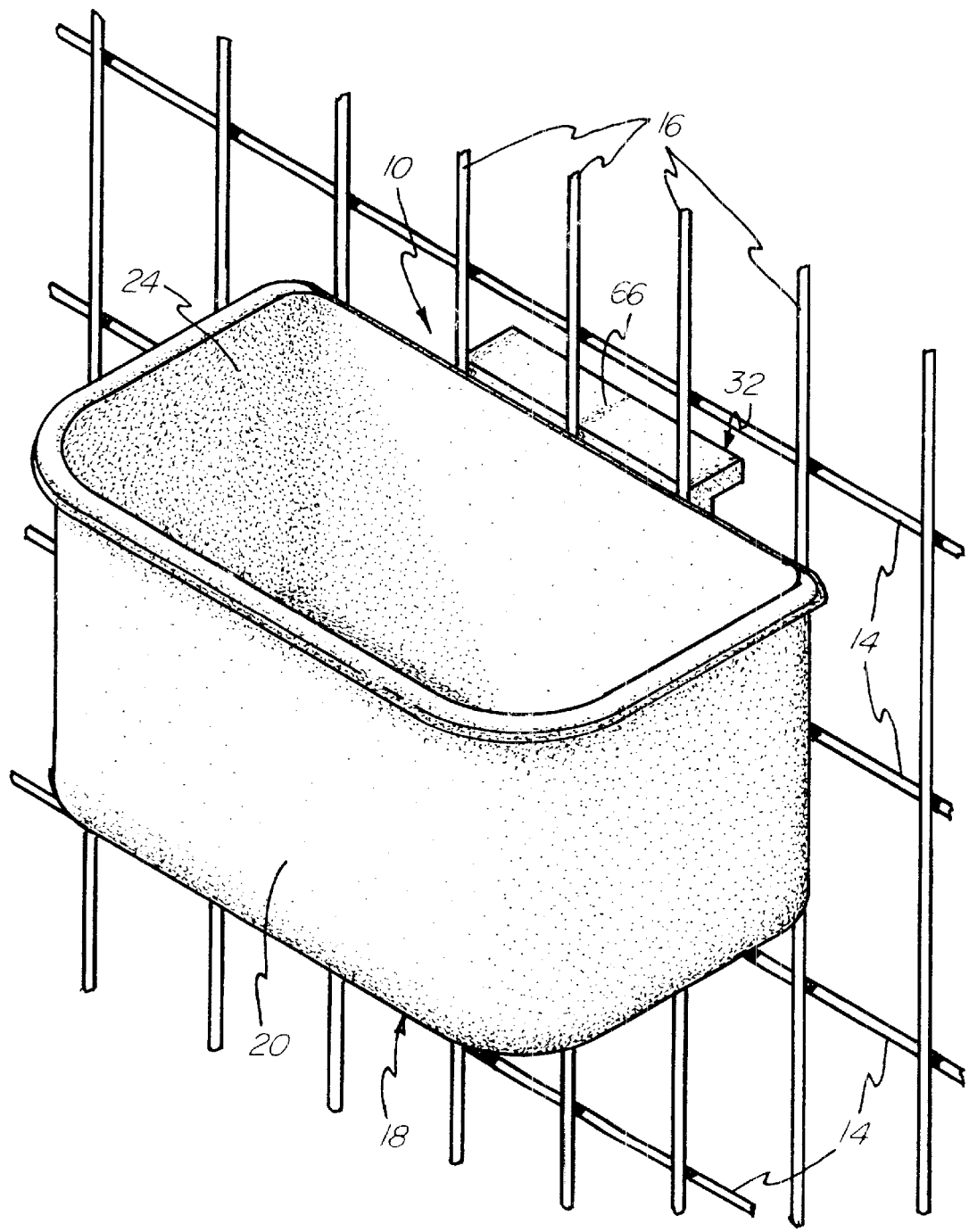
FIG. 5 is a front perspective view showing the feed dish attached to the side of a cage.

Referring to FIGS. 4 and 5, the dish 10 of the present invention is shown mounted to a cage side 12 wherein the leg members 28, 30 are positioned above one of the horizontal elements 14 and extending through the lattice defined by the horizontal and vertical elements 14, 16. With the rear portion 26 of the bowl 18 positioned in engagement with the cage side 12, the slide member 32 is moved downwardly to engage the slots 46, 48 over the respective leg members 28, 30. As the slide member 32 is moved downwardly into position, the rear wall 44 is located in engagement with the walls 38, 40 of the flange members 34, 36, adjacent the respective slot walls 52, 58, to thereby retain the slide member 32 in position on the legs 28, 30. In this position, the front face 42 of the slide member 32 faces toward the rear portion 26 of the bowl 18 and engages the cage side 12 therebetween to thereby wedge the bowl 18 up against the cage side 12.

Removal of the feed dish 10 from the cage side 12 is the reverse of installation wherein a person may engage the underside of the ledge portion 66 to lift the slide member 32 upwardly and disengage the slots 46, 48 from the legs 28, 30.

Figure 6:
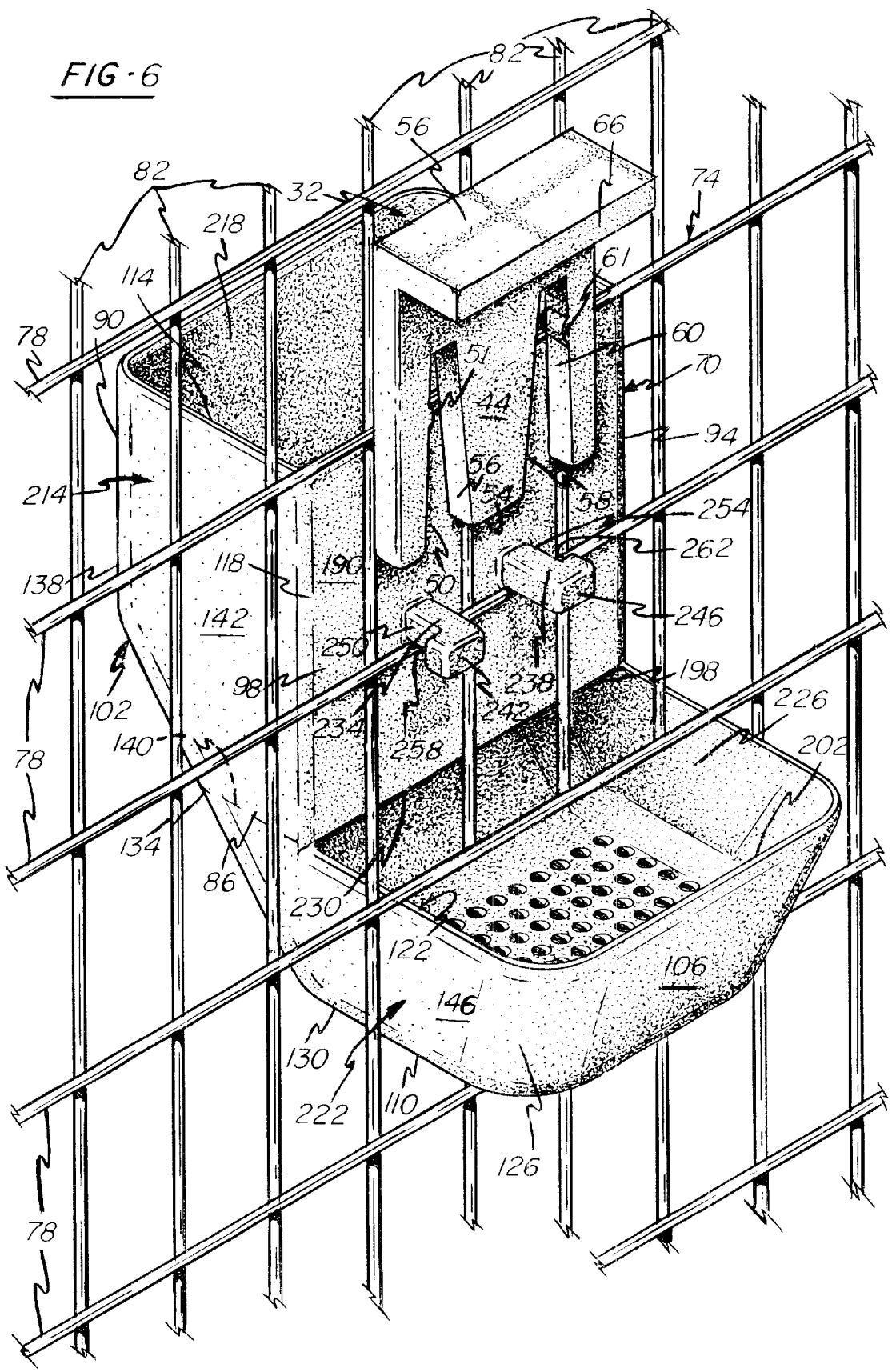
FIG. 6 is a partially exploded rear perspective view of an alternative embodiment illustrating a dispenser including the mounting structure of the present structure prior to attachment to the side of a cage.

Referring additionally to FIG. 6, in a further embodiment, an animal feed dispenser 70 in accordance with the present invention is illustrated in association with an animal cage side 74 formed as a lattice structure of interconnected horizontal elements 78 and vertical elements 82. As illustrated a portion of the vertical elements 82 are removed to accommodate insertion of a forwardly extending portion of the dispenser 70 through the cage side 74, whereby, refilling of the dispenser 70 from the exterior of the cage is facilitated. Also, as with the previous embodiment, the dispenser 70 is preferably formed of ABS plastic as an integral molded structure.

Figure 7:
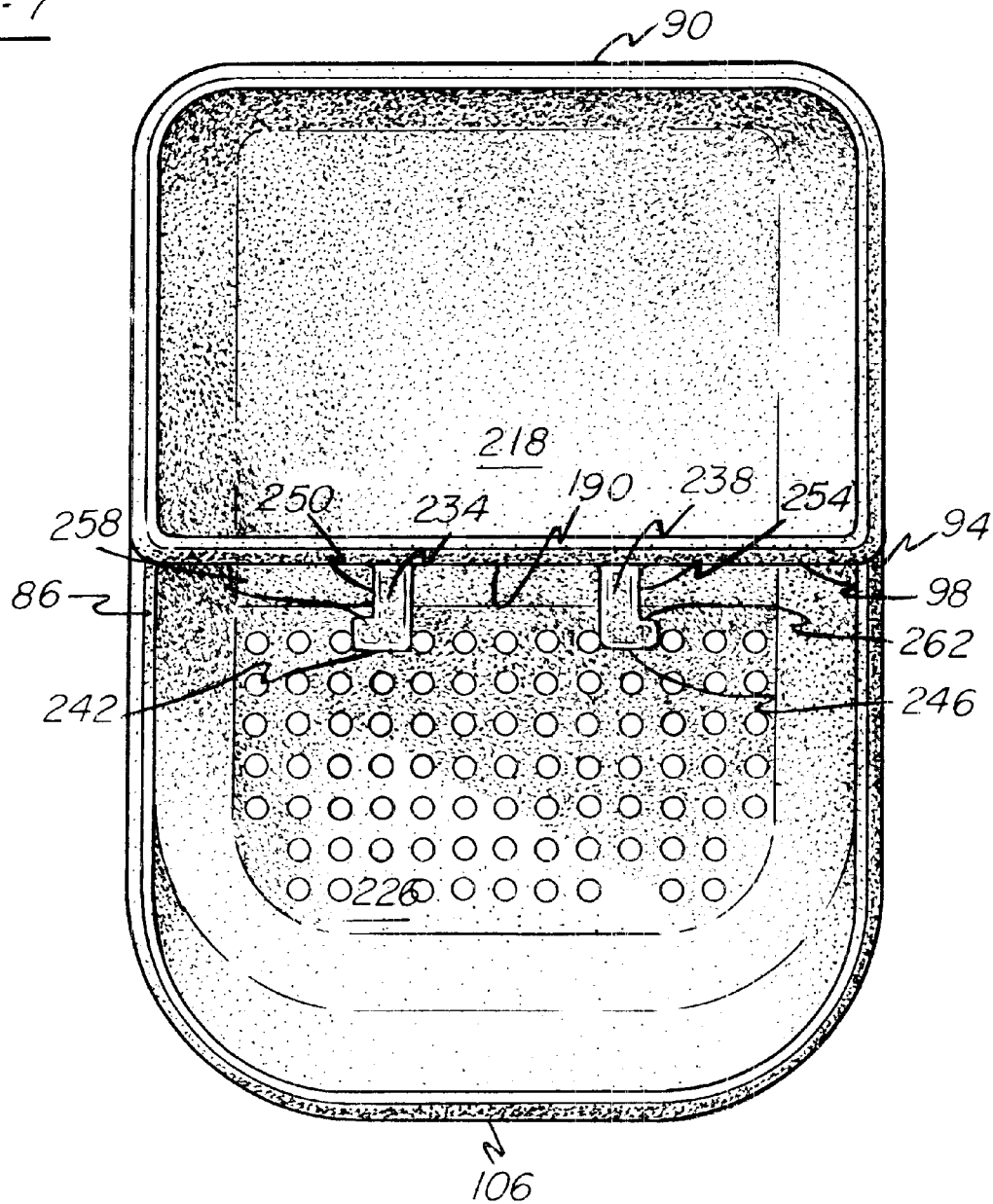
FIG. 7 is a top plan view of the embodiment of FIG. 6.
Figure 8:
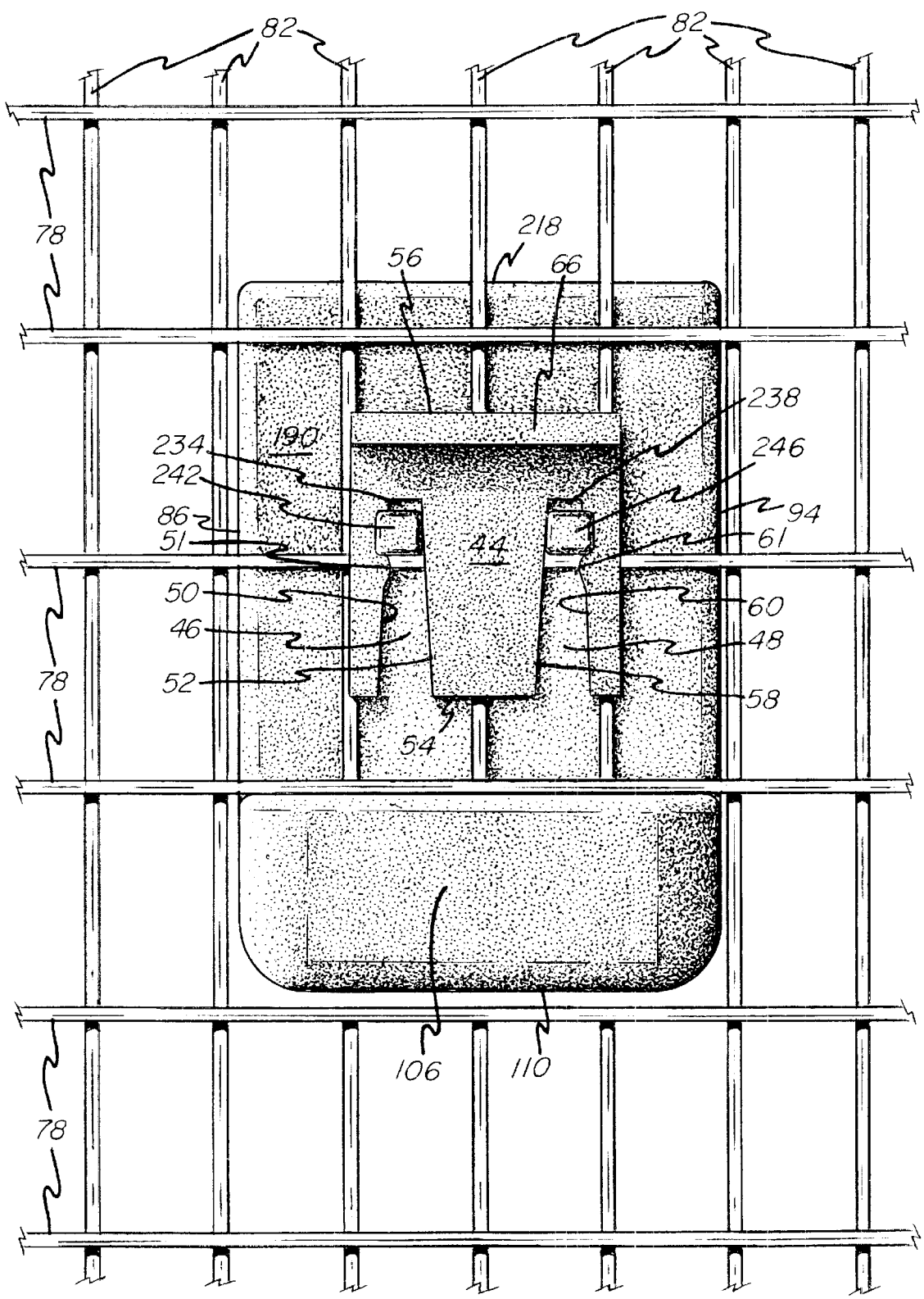
FIG. 8 is a rear elevational view of the embodiment of FIG. 6 with the mounting structure supporting the dispenser on a cage side.
Figure 9:
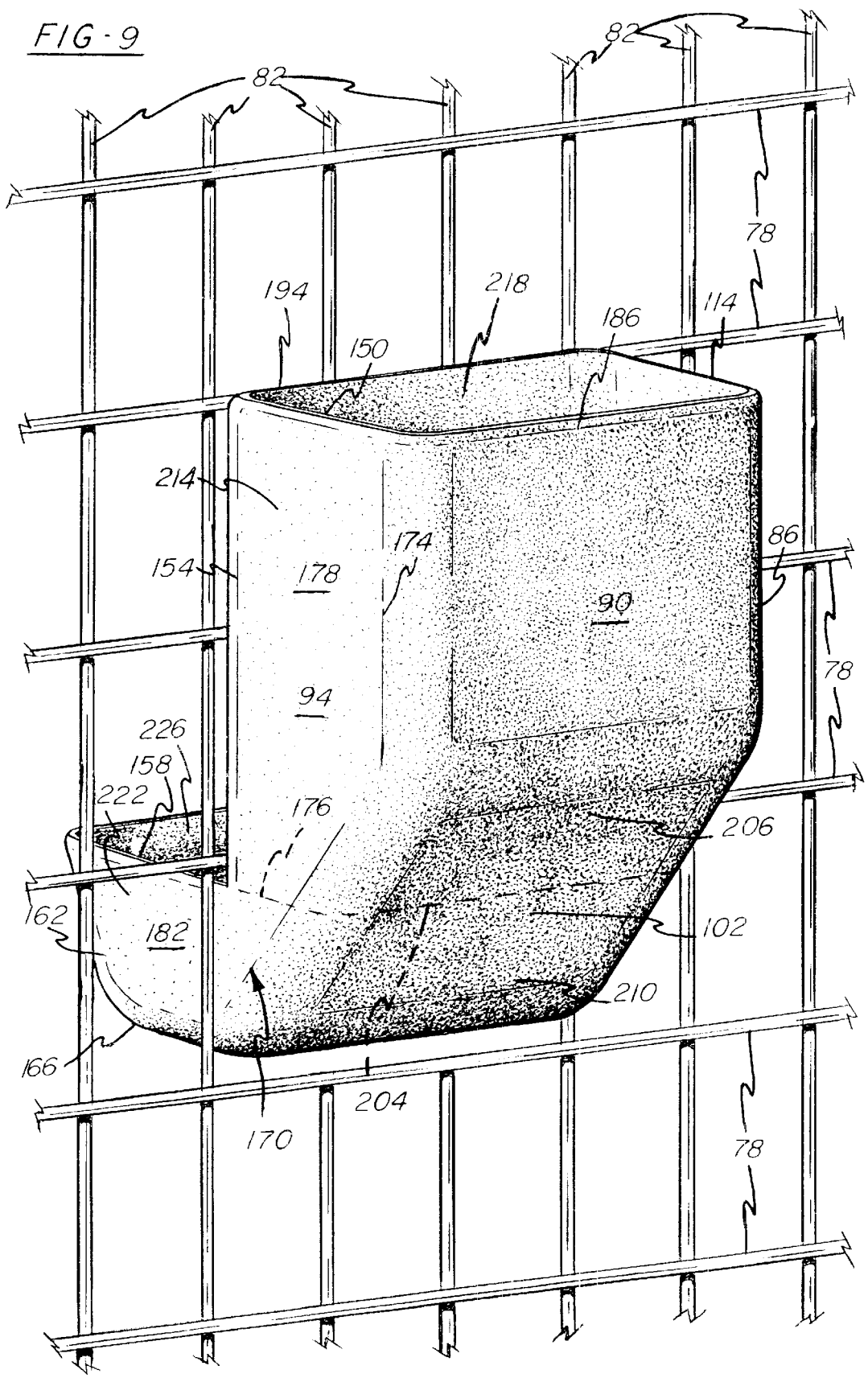
FIG. 9 is a front perspective view of the embodiment of FIG. 6 showing the dispenser attached to the side of a cage.

Referring additionally to FIGS. 7–9, the dispenser 70 comprises a first sidewall 86, an upper rear wall 90 having an upper edge 186, a second sidewall 94, a first front wall 98 defining a planar surface 190 including upper and lower edges 194 and 198, a lower rear wall 102, a second front wall 106 having an upper edge 202, and a bottom 110. The first sidewall 86 is defined by a first upper edge 114, a first front edge 118, a second upper edge 122, a second front edge 126, a bottom edge 130, a lower rear edge 134, and an upper rear edge 138. The lower rear edge 134 extends downwardly from the upper rear edge 138 to the bottom edge 130 angled inwardly in a rear to front direction. The rear to front distance from the upper rear edge 138 to the first front edge 118 is less than the rear to front distance from the upper rear edge 138 to the second front edge 126. The first sidewall 86 comprises a dividing line 140 between the upper portion 142 and the lower portion 146 defined by a line in line with the second upper edge 122.

As best seen in FIG. 9, the second sidewall 94 has a construction similar to the first sidewall 86 and includes a first upper edge 150, a first front edge 154, a second upper edge 158, a second front edge 162, a bottom edge 166, a lower rear edge 170, and an upper rear edge 174. The lower rear edge 170 extends downwardly from the upper rear edge 174 to the bottom edge 166 angled inwardly in a rear to front direction. The rear to front distance from the upper rear edge 174 to the first front edge 154 is less than the rear to front distance from the upper rear edge 174 to the second front edge 162. As with the first sidewall 86, the second sidewall 94 comprises a dividing line 176 between the upper portion 178 and the lower portion 182 defined by a line in line with the second upper edge 158. Similarly, the lower rear wall 102 comprises a dividing line 204, between an upper portion 206 and a lower portion 210, defined by a line extending in line with the dividing lines 140, 176.

Together, the upper portion 142 of the first sidewall 86, the upper rear wall 90, the upper portion 206 of the lower rear wall 102, the upper portion 178 of the second sidewall 94, and the first front wall 98 define an upper storage compartment 214. The first upper edge 114 of the first sidewall 86, the upper edge 186 of the upper rear wall 90, the first upper edge 150 of the second sidewall 94, and the upper edge 194 of the first front wall 98 define a first opening 218.

Together, the lower portion 146 of the first sidewall 86, the lower portion 210 of the lower rear wall 102, the lower portion 182 of the second sidewall 94, the second front wall 106, and the bottom 110 define a lower tray 222. The second upper edge 122 of the first sidewall 86, the lower edge 198 of the first front wall 98, the second upper edge 158 of the second sidewall 94, and the upper edge 202 of the second front wall 106 define a second opening 226.

The dividing line 140 of the first sidewall 86, the dividing line 204 of the lower rear wall 102, the dividing line 176 of the second sidewall 94, and the lower edge 198 of the first front wall 98 define a passageway 230 between the upper storage compartment 214 and the lower tray 222.

It should be understood that within the scope of the present invention, the planar surface 190 of the first front wall may be configured differently to correspond to other cage side shapes, such as by being provided with a curvature to correspond to a curved cage side.

The dispenser 70 is further provided with a mounting structure including an elongated leg structure defined by a pair of horizontally spaced, elongated legs 234, 238, and a slide member 32, which structure is substantially similar to that described for the previous embodiment. The leg members 234, 238 each include a respective outer wall 250, 254 spaced a distance corresponding to the spacing between the walls 50 and 60 of the slide member 32, and each terminate in a respective flange member 242, 246 defining an enlarged portion for the leg structure at an end of the leg structure distal from the planar surface 190 of the first front wall 98. The flange members 242, 246 each define a respective wall 258, 262 extending horizontally in a perpendicular direction from the leg members 242, 246, respectively.

Referring to FIGS. 8 and 9, the dispenser 70 of the present invention is shown mounted to a cage side 74 wherein the leg members 234, 238 are positioned above one of the horizontal elements 78 and extending through the lattice defined by the horizontal and vertical elements 78, 82. With the planar surface 190 of the first front wall 98 positioned in engagement with the cage side 74, the slide member 32 is moved downwardly to engage the slots 46, 48 over the respective leg members 234, 238. As the slide member 32 is moved downwardly into position, the first front wall 98 is located in engagement with the walls 258, 262 of the flange members 242, 246, adjacent the respective slot walls 52, 58, to thereby retain the slide member 32 in position on the legs 234, 238. In this position, the front face 42 of the slide member 32 faces toward the planar surface 190 of the first front wall 98 and engages the cage side 74 there between to thereby wedge the dispenser 70 up against the cage side 74.

Removal of the dispenser 70 from the cage side 74 is the reverse of installation wherein a person may engage the underside of the ledge portion 66 to lift the slide member 32 upwardly and disengage the slots 46, 48 from the legs 234, 238.

From the above description, it should be apparent that the present invention provides a convenient and easily manipulated mounting structure for mounting a dispensing device to a cage side. In particular, the present invention provides a slide member moveable in linear movement parallel to a wall of the device in order to engage slots in the slide member with leg members of the device wherein such engagement between the slide member and the legs may be performed by persons of even limited tactile ability for manipulating objects. Further, it should be apparent that although the present mounting structure provides an easily manipulated securing means for a dispenser, the ease of installation does not detract from the security of the installation and that the dispenser of the present invention will remain securely in position until such time as the slide member is detached from the leg members.

While the forms of apparatus herein described constitutes two preferred embodiments of this invention, it is to be understood that the invention is not limited to these precise forms of apparatus, and that changes may be made therein without departing from the scope of the invention which is defined in the appended claims.

What is claimed is:

1. A dish assembly for use in combination with a cage having a cage side formed as a lattice of horizontal and vertical members, said dish assembly comprising:

a dispenser and a mounting structure for attaching the dispenser to a cage side;

the dispenser further comprising at least one planar surface;

said mounting structure comprising an elongated leg structure including a pair of elongated legs extending from said planar surface of said dispenser, away from said planar surface, for extending through the lattice of the cage side;

each elongated leg including a respective enlarged portion located distal from said planar surface of said dispenser;

said mounting structure further including a slide member for engaging the leg structure in linear sliding movement wherein said slide member comprises a top edge and a bottom edge and includes slots extending from said bottom edge toward said top edge for engaging over the elongated leg structure in linear sliding movement perpendicular to the leg structure and parallel to said planar surface of said dispenser whereby the slide member is located between said planar surface and the enlarged portions of the legs.

2. The dish assembly of claim 1 wherein said slide member comprises a generally planar member.

3. The dish assembly of claim 1 wherein said slide member comprises a generally planar member having a planar front face and a planar rear face and engagement of said pair of slots with said legs locates said rear face in engagement with said enlarged portions and locates said front face in a position facing said planar surface of said dispenser to engage a cage side located between said planar surface and said slide member.

4. The dish assembly of claim 1 wherein each said slot includes a protrusion for providing a snap fit connection for retaining said slide member on said legs.

5. The dish assembly of claim 1 wherein said dispenser comprises an upper storage compartment and a lower tray.

6. The dish assembly of claim 5, wherein, said dispenser comprises opposing first and a second sidewalls, each said sidewall comprising an upper portion and a lower portion;

a lower rear wall extending between said first and second sidewalls, said lower rear wall including upper and lower portions and extending between said upper storage compartment and said lower tray;

said upper storage compartment defines a tubular member formed by said upper portions of said first and second sidewalls, a first front wall extending between said upper portions of said first and second sidewalls, an upper rear wall located in opposing relation to said first front wall, and said upper portion of said lower rear wall extending downwardly from said upper rear wall;

said lower tray comprises said lower portions of said first and second sidewalls, a second front wall extending between said lower portions of said first and second sidewalls, said lower portion of said lower rear wall, and a bottom extending from lower edges of said lower portions of said sidewalls, said second front wall and said lower portion of said lower rear wall to define a support surface within said lower tray;

wherein a passage is defined from said upper storage compartment to said lower tray, passing below a lower edge of said first front wall.

7. A dish assembly for use in combination with a cage having a cage side formed as a lattice of horizontal and vertical members, said dish assembly comprising:

a dispenser and a mounting structure for attaching the dispenser to a cage side;

said dispenser comprises opposing first and a second sidewalls, each said sidewall comprising an upper portion and a lower portion;

a lower rear wall extending between said first and second sidewalls, said lower rear wall including upper and lower portions and extending between said upper storage compartment and said lower tray;

said upper storage compartment defines a tubular member formed by said upper portions of said first and second sidewalls, a first front wall extending between said upper portions of said first and second sidewalls, an upper rear wall located in opposing relation to said first front wall, and said upper portion of said lower rear wall extending downwardly from said upper rear wall;

said lower tray comprises said lower portions of said first and second sidewalls, a second front wall extending between said lower portions of said first and second sidewalls, said lower portion of said lower rear wall, and a bottom extending from lower edges of said lower portions of said sidewalls, said second front wall and said lower portion of said lower rear wall to define a support surface within said lower tray;

wherein a passageway is defined from said upper storage compartment to said lower tray, passing below a lower edge of said first front wall;

said mounting structure comprising an elongated leg structure extending from said planar surface of the dispenser, away from said first front wall, for extending through the lattice of the cage side;

elongated leg including a respective enlarged portion located distal from said planar surface;

said mounting structure further including a slide member for engaging the leg structure in linear sliding movement wherein said slide member comprises a top edge and a bottom edge and includes slots extending from said bottom edge toward said top edge for engaging over the elongated leg structure in linear sliding movement perpendicular to the leg structure and parallel to said first front wall whereby the slide member is located between said first front wall and the enlarged portions of the leg.

8. The dish assembly of claim 7 wherein said slide member comprises a generally planar member.

9. The dish assembly of claim 7 wherein said slide member comprises a generally planar member having a planar front face and a planar rear face and engagement of said pair of slots with said legs locates said rear face in engagement with said enlarged portions and locates said front face in a position facing said planar surface to engage a cage side located between said planar surface and said slide member.

10. The dish assembly of claim 7 wherein each said slot includes a protrusion for providing a snap fit connection for retaining said slide member on said legs.

11. The dish assembly of claim 7 wherein the mounting structure is located extending from said first front wall of said dispenser such that the storage compartment is located on the exterior of the cage and a forwardly extending portion of said lower tray extends through the corresponding cage side such that the feed or water is accessible from the interior of the cage.

12. The dish assembly of claim 7 wherein said bottom of said lower tray further comprises a plurality of openings.

* * * * *